United States Patent
Woelki et al.

[11] Patent Number: 5,971,617
[45] Date of Patent: Oct. 26, 1999

[54] SELF-LUBRICATED BEARING

[75] Inventors: Peter Woelki, Mönchengladbach, Germany; Dominique Petit, Housse, Belgium; Friedrich Harig, Willich, Germany

[73] Assignee: Norton Pampus GmbH, Willich, Germany

[21] Appl. No.: 08/899,572

[22] Filed: Jul. 24, 1997

[51] Int. Cl.[6] .................................................. F16C 17/02
[52] U.S. Cl. .......................................... 384/295; 384/284
[58] Field of Search ...................................... 384/276–300

[56]  References Cited

U.S. PATENT DOCUMENTS

| | | | |
|---|---|---|---|
| 2,689,380 | 9/1954 | Tait ............................................ | 18/59 |
| 2,691,814 | 10/1954 | Tait ........................................ | 29/182.5 |
| 2,788,324 | 4/1957 | Mitchell ................................. | 252/12.2 |
| 2,798,005 | 7/1957 | Love .......................................... | 117/8 |
| 2,813,041 | 11/1957 | Mitchell et al. ........................... | 117/21 |
| 2,995,462 | 8/1961 | Mitchell et al. ............................. | 117/8 |
| 3,234,128 | 2/1966 | McLeish et al. .......................... | 252/12 |
| 5,573,846 | 11/1996 | Harig et al. .............................. | 428/323 |

*Primary Examiner*—Lenard A. Footland
*Attorney, Agent, or Firm*—Mary E. Porter; Sampson & Associates

[57]  ABSTRACT

A self-lubricating bearing is fabricated as a laminate of a metallic substrate and a series of raised structures formed integrally therewith and extending orthogonally therefrom. A fluoropolymer sliding or bearing layer is superposed with the substrate, with the raised structures embedded therein. The raised structures serve to hold the bearing layer in place to help prevent it from sliding along the surface of substrate during bearing operation. This anchorage to the substrate enables a relatively thick bearing layer to be utilized to relatively reduce tendency to creep. Alternatively, the structures provide a bearing having a relatively thin load bearing layer with a relatively constant friction coefficient over its life, with the structures acting as thermal and electrical bridges for relatively high heat and electrical conductivity between the substrate and a supported article such as a rotating shaft. The structures also may be in direct contact with the supported article to help prevent bedding-in. In this regard, the bearings are provided with a relatively low coefficient of friction, long bearing life, resistance to creep and mechanical stresses, and are electrically and thermally conductive.

25 Claims, 3 Drawing Sheets

SELF-LUBRICATED BEARING

BACKGROUND OF THE INVENTION

1. Field of the Invention

This invention relates to bearings, and more particularly to a maintenance free bearing having a lubricious wear layer that is resistant to creep.

2. Background Information

Maintenance-free sliding bearings comprising a metal support and a plastic layer are known. Such bearings provide convenient means for rotatably, pivotably or slidably fastening multiple members to one another in a maintenance free manner. Applications for such bearings include those that utilize continuous rotational movement such as journals for supporting a driven shaft. These bearings are also suitable for applications that employ repeated pivotal movement such as automotive door hinges, door checks, brake and accelerator pedals. Additional applications include those that utilize repeated reciprocal movement such as automotive shock absorbers and struts. These bearings may also be used in lighter duty applications such as multiple bar linkages commonly utilized in the automotive industry for trunk deck lid and hood hinges. Such maintenance free bearings may comprise a variety of configurations, such as, for example, bushes or journal bearings, thrust bearings or washers, locating pads, valve port plates, and wearing components for a variety of mechanisms.

One such bearing in particular is referred to herein as a "DU" bearing available from The Glacier Metal Company Limited, Argule House, Joel Street, Northwood Hills, Middlesex HA6 1LN, England. The DU bearing consists of a composite material in which a porous bronze layer is bonded to a metal backing. The porous bronze layer is impregnated with a polymer such as PTFE (polytetrafluoroethylene), with a top layer or lining of polymer disposed thereon.

One aspect of this construction is that the ratio of polymer to bronze tends to change with depth, with the bronze being relatively more concentrated closer to the metal backing. This provides a reduced concentration of low friction material close to the backing metal. Thus, the coefficient of friction tends to disadvantageously vary (increase) over the bearing life. An additional drawback of this concentration gradient is that any operation that removes material from the bearing layer, such as the common practices of boring, broaching or burnishing the bearings to size after installation, generally cannot be accomplished without a reduction in bearing performance.

A bearing developed to overcome these limitations, sold under the designation "Norglide", is available from Norton Pampus, GmbH, of Willich, Germany. Norglide comprises a thin sheet of bearing material, such as, for example, a PTFE compound, bonded onto steel backing using high temperature thermoplastic films, (eg. PFA and ETFE) heat and pressure. Since the bearing layer is fabricated as a discrete sheet, rather than a dispersion as in the case of the aforementioned DU bearings, the Norglide bearing layer is homogeneous. This aspect advantageously provides a coefficient of friction that remains nominally constant throughout the bearing life. Moreover, the coefficient of friction of the Norglide bearing may be lower than other prior art bearings due to the ability to utilize reduced filler content or fillers that have less negative impact on the coefficient of friction. For example, the Norglide bearing may utilize graphite filler rather than bronze as discussed hereinabove. Also, such homogeneity enables the bearing surface of Norglide bearings to be bored, broached or burnished to size after installation nominally without reducing the performance thereof.

This construction, however, is not without limitations. In particular, the relatively high thickness of the PTFE compound and the low filler content tend to enable the bearing layer to creep or bed in under heavy stress. Moreover, the bearing layer may tend to delaminate from the metal backing in the event the laminate is bent to a particularly small radius. PTFE compounds also tend to be poor conductors of heat. As such, these bearings, even when fabricated using bronze filled PTFE sheets (see the discussion of "Norglide M" bearings hereinbelow), tend to exhibit relatively low heat transfer. Finally, although PTFE may be made electrically conductive, the hot melt film used to bond the bearing layer to the metal backing is electrically insulative. This aspect tends to make the Norglide bearings undesirable for use in applications that rely on electrical continuity such as, for example, electrostatic painting in the automotive and other metal fabricating industries.

The creep and delamination problems may be addressed by roughening the metal backing surface, such as by sandblasting, etc., prior to application of the bearing surface. However, the process is relatively cumbersome, time consuming and adds expense to the process.

As mentioned hereinabove, a variation of Norglide also available from Norton Pampus is known as "Norglide M." Norglide M is substantially similar to Norglide, but utilizes a bearing layer having an open-mesh metal fabric reinforcement disposed therein. The use of this reinforcement tends to ameliorate the aforementioned creep and conductivity drawbacks, but does not address the delamination and electrical conductivity concerns.

Thus, a need exists for an improved maintenance free bearing that addresses the problems of the prior art.

SUMMARY OF THE INVENTION

According to a first aspect of the present invention, a maintenance-free sliding bearing includes a substrate having a surface and a plurality of structures disposed in spaced relation along, and extending substantially orthogonally therefrom. A load bearing layer is superposed with the surface in engagement with the plurality of structures, so that the structures are embedded therein.

In a second aspect of the present invention, a method of fabrication of a maintenance-free sliding bearing includes the steps of:

(a) providing a substrate having a surface;
(b) integrally disposing a plurality of structures in spaced relation along, and extending substantially orthogonally from, the surface; and
(c) disposing a load bearing layer in superposed alignment with the surface in engagement with the plurality of structures, wherein the structures are embedded into the load bearing layer.

The above and other features and advantages of this invention will be more readily apparent from a reading of the following detailed description of various aspects of the invention taken in conjunction with the accompanying drawings.

DETAILED DESCRIPTION OF THE PREFERRED EMBODIMENTS

Figure 1:
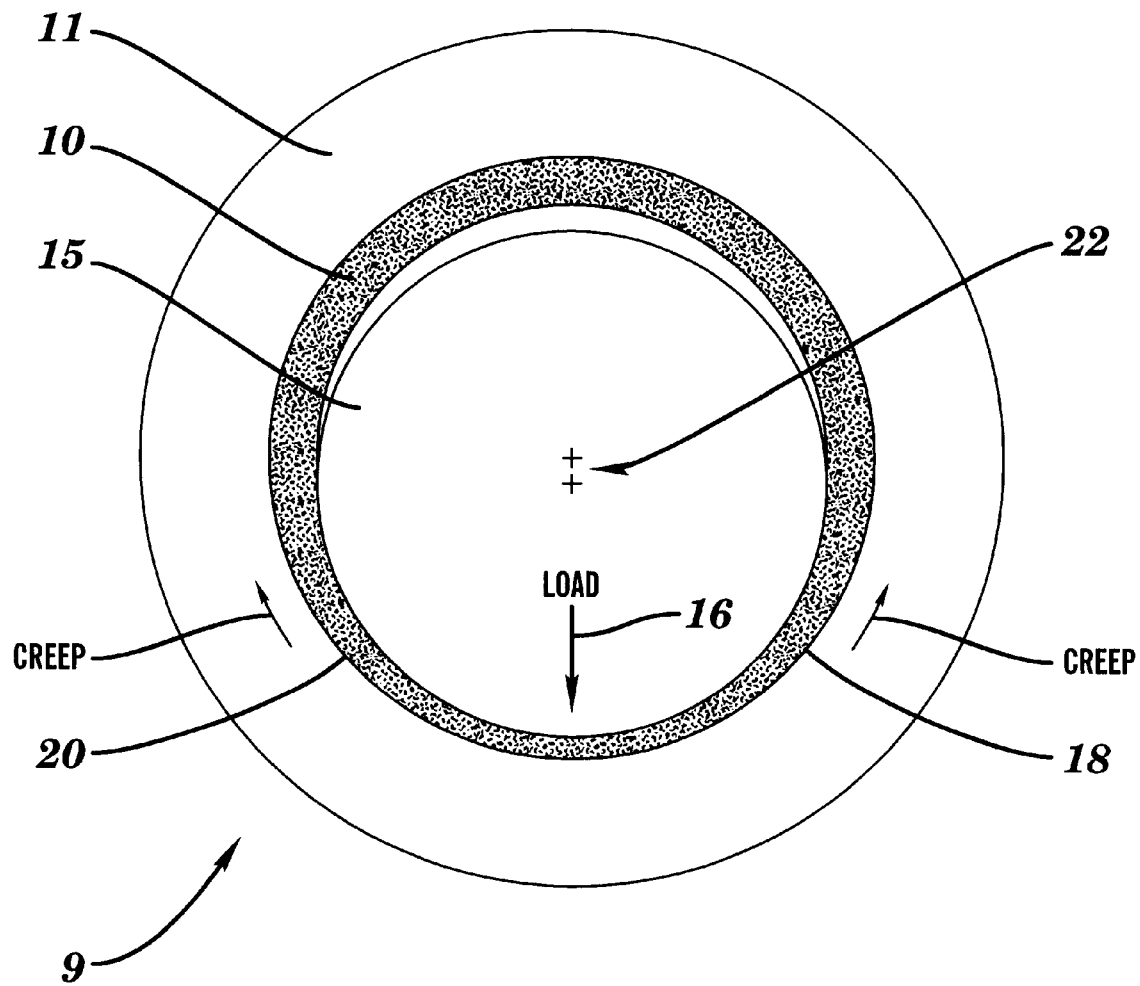
FIG. 1 is a schematic end view of a maintenance-free bearing of the prior art, fabricated as a journal bearing and supporting a shaft therein.

Briefly described, as shown in the drawings, the present invention comprises a self-lubricating bearing 110 fabricated as a laminate of a metallic backing, support or substrate 112, a series of raised structures 113 extending orthogonally therefrom, and a polymeric sliding, wear or load bearing layer 114 superposed thereover. Raised structures 113 preferably are fabricated from bronze, fastened integrally to substrate 112 and embedded into load bearing layer 114.

Structures 113 serve to maintain load bearing layer 114 in place to help prevent it from sliding along the surface of substrate 112 during bearing operation. This improved anchorage to the substrate enables a relatively thick bearing layer to be utilized with a reduced tendency to creep. Alternatively, structures 113 provide a bearing 110, fabricated with a relatively thin load bearing layer 114, with a friction coefficient that remains relatively constant over its life. Moreover, structures 113 act as thermal and electrical bridges for relatively high heat and electrical conductivity between support 112 and a supported article such as a rotating shaft. The raised structures thus may act as boundaries surrounding and retaining discrete pockets of self-lubricating material locally available for lubrication but unable to escape therefrom during bearing operation. Structures 113 also may be in direct contact with the supported article to help prevent bedding-in. Thus, advantageously, bearings 110 are provided with a relatively low coefficient of friction, long bearing life, resistance to creep and mechanical stresses, and are electrically and thermally conductive.

Throughout this disclosure, the terms "self-lubricated" or "self-lubricating" shall refer to use of a material that exhibits sufficient lubricity to nominally eliminate the need for application of a discrete lubricant to a bearing surface.

Referring now to the drawings in detail, the effect of creep is shown in FIG. 1 relative to a prior art journal bearing 9 fabricated with a metal housing 11 and a maintenance free bearing 10 including a plastic load bearing layer as generally described hereinabove. Bearing 10 is adapted to support a shaft 15 which is weighted to apply a load in the direction indicated by arrow 16. In response to this loading, the load bearing layer tends to creep or become displaced in the direction indicated by arrows 18 and 20 ("radial creep") as well as in the axial direction ("axial creep", not shown) wherein the shaft effectively "beds in" to bearing 10. Disadvantageously, this action generates a loss of center alignment of shaft 16 as shown at 22.

Figure 2:
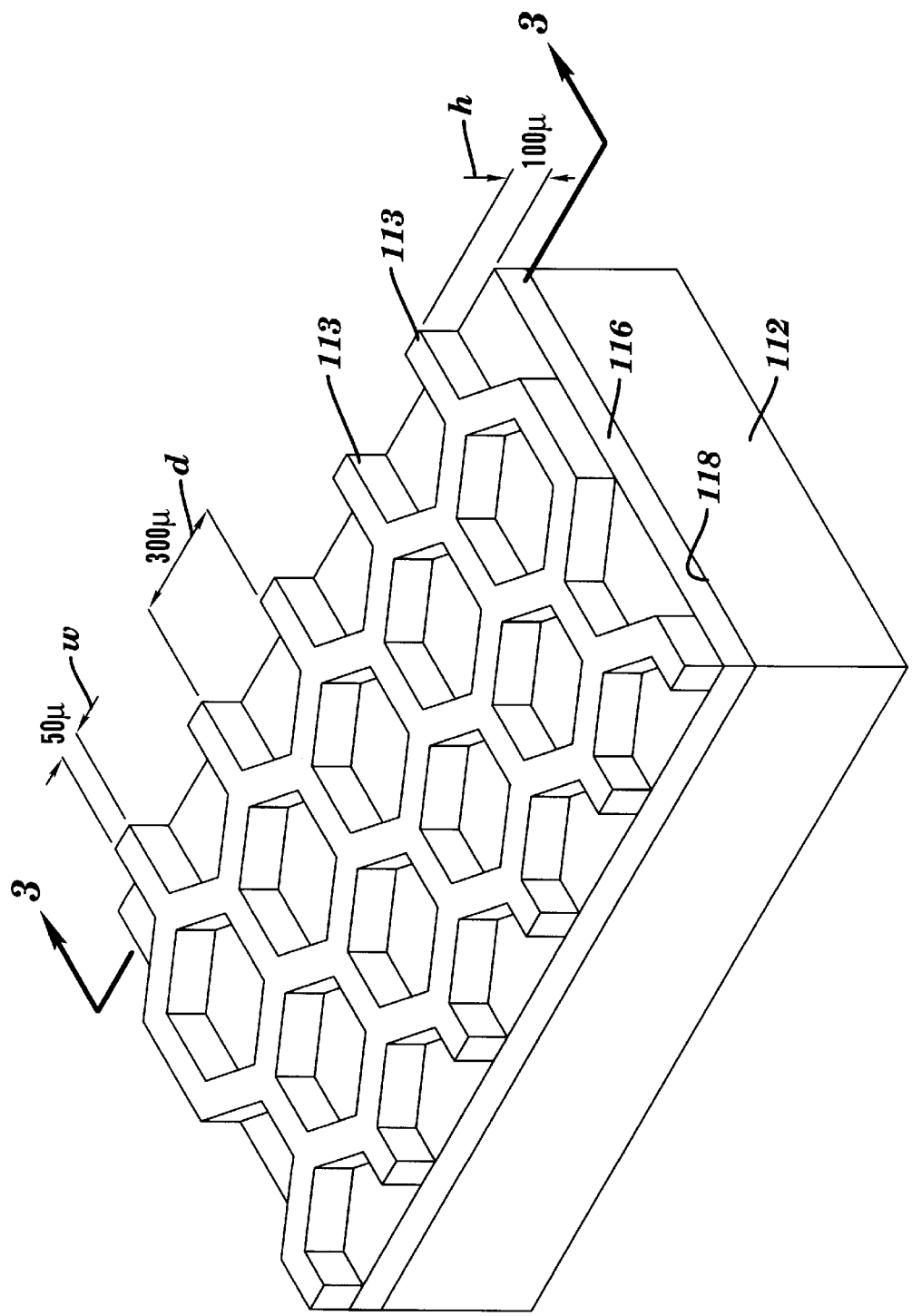
FIG. 2 is a perspective view, on an enlarged scale, of portions of a bearing of the present invention.
Figure 3:
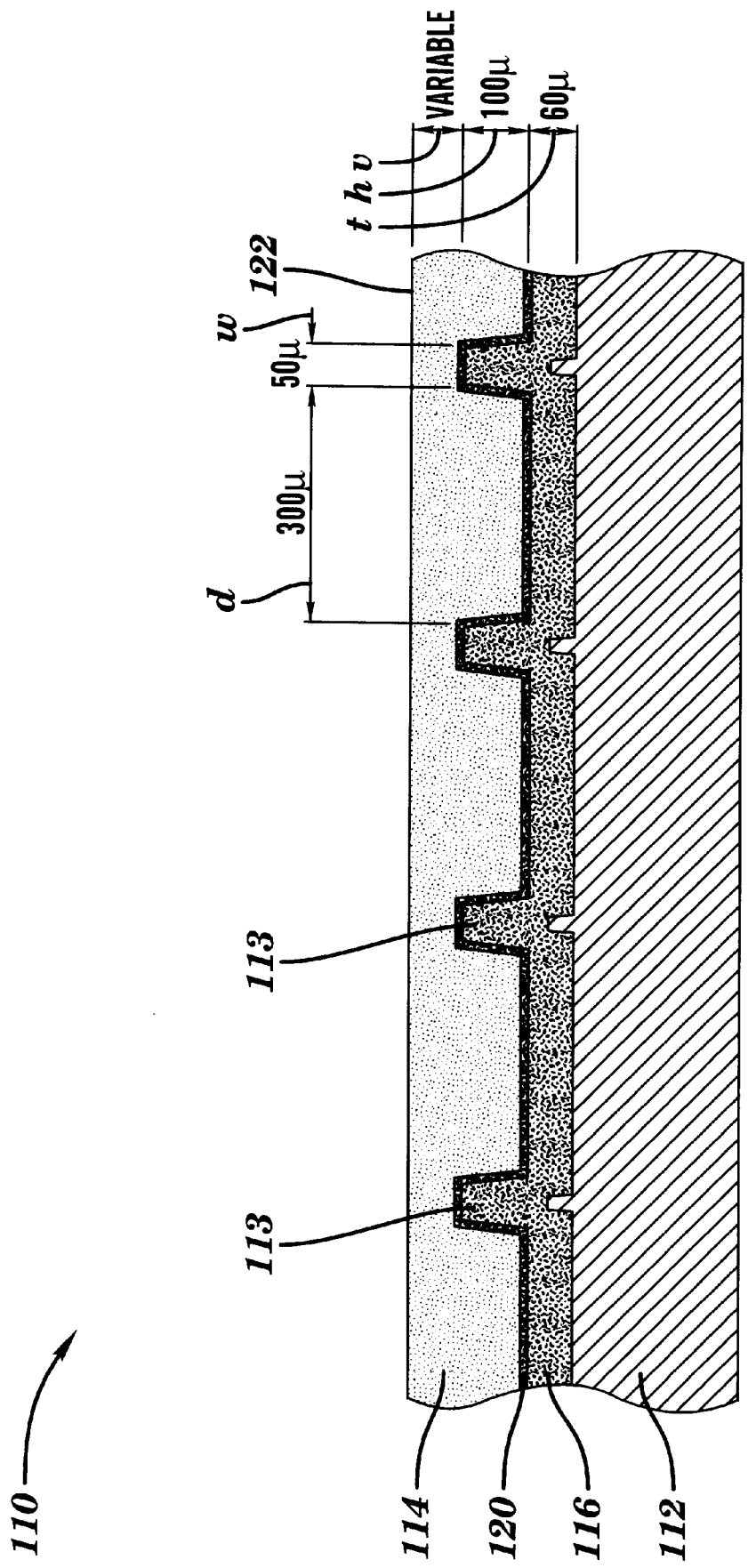
FIG. 3 is a cross-sectional view talken along 3—3 of FIG. 2, which illustrates the portions of a bearing shown in FIG. 2, with a sliding or bearing layer disposed thereon.

Referring now to FIGS. 2 and 3, the present invention comprises a bearing 110 having a backing or substrate 112 fabricated from a metallic or other material capable of providing bearing 110 with requisite structural integrity for an intended application. As shown, raised structures 113 are preferably fabricated as integral components of an intermediate layer 116 that extends continuously in a superimposed manner over a surface 118 of support 112. In a preferred embodiment, structures 113 comprise a generally honeycomb-like pattern substantially as shown, but may however, be fabricated with substantially any geometric pattern sufficient to provide anchorage for the wear layer, as will be discussed hereinafter. For example, structures 113 may comprise a series of connected or discontinuous polygons such as squares, circles, triangles etc., or may comprise a series of discrete posts (not shown) that extend approximately orthogonally relative to surface 118 of support 112. As shown, in a preferred embodiment, layer 116 has a thickness t of approximately 60 microns ($\mu$), structures 113 have a height h of approximately 100$\mu$, a width w of approximately 50$\mu$ and are spaced to define an interior dimension d of approximately 300$\mu$. Moreover, the skilled artisan will recognize that a small degree of conicity of structures 113 is preferred to facilitate manufacture of the structures using an embosser or a mold.

As shown in FIG. 3, load bearing layer 114 is laminated to structures 113 and intermediate layer 116, being bonded thereto by a layer of adhesive 120. Thus, as shown, structures 113 are embedded within load bearing layer 114, with the bearing layer having a substantially smooth outermost surface 122 disposed a predetermined orthogonal distance v from structures 113. Distance v may be varied depending on the intended application for bearing 110.

Substrate 112 may be fabricated from various metals, including steel or aluminum, as well as additional materials such as stainless steel, conventional drawing quality sheet steel, brass or other alloys, or from plastics, ceramics or composites utilizing glass or carbon fibers. Surface 118 thereof may be left untreated, or treated using various techniques such as galvanizing, chromate or phosphate treatments, anodizing (in the case of an aluminum substrate), mechanical sandblasting and/or chemical pickling. It is also contemplated that a steel substrate coated with porous bronze, such as utilized in the aforementioned DU bearing, may be utilized in the fabrication of the present invention. Moreover, substrate 112 may be provided with structures 113 by a discontinuous laser beam which, by selectively hitting surface 118 and melting it over a relatively small area, creates regularly spaced craters over surface 118 thereof.

Load bearing layer 114 may comprise any number of suitable lubricious substances, such as a polymer or plastic material, including a fluoropolymer, for example, the compounds disclosed in U.S. Pat. No. 5,573,846, entitled POLYFLUOROCARBON COATED METAL BEARING which issued on Nov. 12, 1996 and which is hereby incorporated by reference. Preferred plastic materials generally include temperature tolerant polymer systems containing high melt temperature organic polymers, and/or systems characterized by a relatively low coefficient of friction. The materials have to be suitable for application or lamination to the material from which the substrate is fabricated. In this regard, fluoropolymers are the preferred adhesives. For example, by selecting an appropriate adhesive layer 120, nominally any organic polymer may be laminated as the load bearing layer 114 to a metal substrate.

Examples of useful polymeric materials in load bearing layer 114 include fluoropolymers (e.g., polytetrafluoroethylene (PTFE), fluorinated ethylene-propylene (FEP), polyvinylidene flouride (PVDF), polychlorotrifluoroethylene (PCTFE), ethylene-chlorotrifluoroethylene (ECTFE), and perfluoroalkoxy polymer (PFA)), acetal, polycarbonate, polyimides, polyetherimide, polyether ether ketone (PEEK), polyethylene, polypropylene, polysulfones (e.g., polyethersulfone), polyamide (Nylon), polyphenylene sulfide, polyurethane, polyester, polyphenylene oxide, and blends and alloys thereof. In addition, PPS, PPSO$_2$ and aromatic or aliphatic polyketone/ethers, PEI and/or Nylon 46 may be utilized as the continuous matrix. Reactive polymers, such as polyimides, in solid form (unreacted film) or in solution may be utilized. These reactive polymers may thus constitute the continuous matrix. Other polymers such as very high molecular weight polyethylene (which can then be bonded with lower temperature adhesives such as ethylene vinylacetate (EVA)), or polyamides also may be utilized. Moreover, it is contemplated that the bearing layer may be perforated for additional lubrication by grease pockets disposed therein.

Lubricants or fillers are useful. These include various additives that affect polymer characteristics such as lubricity, mechanical strength, wear resistance and thermal and electrical conductivity. Useful additives include, but are not limited to, a minor volume percentage (e.g., 0.5 to 49.5 percent) of glass and/or carbon fiber, silicone, graphite, molybdenum disulfide, aromatic polyester, carbon particles, bronze, fluoropolymer and combinations thereof.

The choice of a particular material for a given application may be made based on the coefficient of friction ($\mu$) of the material. The coefficient of friction between two surfaces is defined in the CRC Handbook of Chemistry and Physics (62nd Edition, 1981-1982) as the ratio of the force required to move one surface over the other to the total force pressing the two together. Thus, if F is the force required to move one surface over another and W, the force pressing the surfaces together, the coefficient of friction $\mu$ is provided by the formula $\mu=F/W$.

For relatively ordinary or light duty applications, acceptable materials include those that have a static coefficient of friction $\mu$ at least below that of steel on steel (0.58) and preferably similar to that of polyethylene (0.2). In heavier duty applications, such as for automotive or general industrial use, materials having relatively lower coefficients are preferred. Preferred materials for these applications are those that, for example, have a coefficient of static friction ($\mu$) similar to that of PTFE (approximately 0.04–0.10).

Although the above static coefficients may be useful for general comparison, the coefficients of dynamic or kinetic friction ($\mu$) are more meaningful in the context of the present invention in light of the continuous and/or repetitive duty applications typically associated with bearings. The test described below was used for determining and comparing values for the coefficients of dynamic friction ($\mu$) for various materials. In the test a series of disks of predetermined dimensions are fabricated, each having a plastic or load bearing layer of a particular material to be tested. The load bearing layers of two nominally identical disks are pressed against opposite sides of a smooth steel plate at a predetermined pressure or load W. The steel plate is then pulled out from between the disks at a predetermined velocity. The force F required to remove the plate is measured and then divided by W to obtain the coefficient of kinetic friction ($\mu$). The test results discussed hereinafter were obtained using a loading W of 565 N and the steel plate was pulled out at a velocity of 50 mm/min. For example, this test typically yields a coefficient of kinetic friction ($\mu$) for filled PTFE of approximately 0.08 to 0.1.

As mentioned hereinabove, layer 114 may also include common fillers. In this regard, since the present invention does not utilize a dispersion of PTFE to facilitate penetration thereof into porous bonze as taught by the prior art, the size of filler particles is generally not of concern. Rather, use of skived PTFE sheet in a preferred embodiment of the invention permits use of fillers of substantially any particle size and concentration provided PTFE is the continuing phase binding the particles together.

Various alternatives are available for adhesive 120. Suitable adhesives include fluoropolymers, such as PFA, MFA, ETFE, FEP, PCTFE, PVDF, curing adhesives such as epoxy, polyimide adhesives, and lower temperature hot melts such as EVA and polyether/polyamide copolymer (Pebax™).

As a further alternative embodiment, layers 114 and 120 are fabricated as a monolayer comprising a polymer blend. For example, a blend of PFA/PTFE, produced by melt extrusion (if PFA is predominant) or by sheet skiving (if PTFE is predominant), may be utilized to serve as both adhesive 120 and load bearing layer 114. The presence of PFA will increase the creep resistance of pure PTFE. This effect may be increased by adding fillers as described hereinabove. Moreover the voids defined by structures 113 may be filled with a dispersion of the chosen polymer (PTFE, PPS, a combination thereof, etc., possibly with fillers), the dispersion dried out, then pressed to form load bearing layer 114. For example, polyimide P84 available from Lending Co., preferably containing PTFE as a filler, may be coated directly onto the structures 113, the solvent flashed off and the polymer fully imidized.

Bearing 110 of the present invention is preferably fabricated by providing a substrate 112 formed as a metallic sheet, with a cladding of bronze superimposed therewith to form an integral intermediate layer 116. This cladding or intermediate layer 116 is bonded to substrate 112 using conventional cladding techniques involving application of heat and pressure to form an integrated composite. This composite is then passed through a conventional calender roll engraved with the negative of the desired pattern of structures 113 such as the honeycomb pattern shown in FIG. 2. Bearing layer 114 may be subsequently formed by laminating a conventional sheet of lubricious material, such as PTFE, using a suitable adhesive as described hereinabove. The entire laminate is then preferably inserted into a conventional press under heat and pressure wherein load bearing layer 114 is provided with outermost surface 122 as shown in FIG. 3. As formed, bearing 110 is substantially complete. Once so fabricated, the bearing may be formed into various application specific configurations using conventional techniques. In addition, a load bearing layer 114 may be laminated on both surfaces of substrate 112 to provide a double-sided bearing.

Bearings 110, fabricated as flat sheets in the mainer previously described, may be formed into any number of bearing types, such as bushes or journal bearings, thrust washers, and skid plates, etc. For example, bushes or journal bearings may be formed by cutting the bearing 110 into strips. Each of these strips, in turn, may be formed into hollow cylinders, with load bearing layer 114 disposed on the inside cylindrical surface thereof, similar to that shown in prior art FIG. 1, or alternatively, on the outside surface thereof, depending on the particular application. The cylindrical bearings may then be flanged using techniques familiar to those skilled in the art, such as, for example, described in the "Norglide, Norton Performance Plastics" catalogue No. PPL-E-067-1, dated November, 1993, (hereinafter the "Norglide catalogue") and which is hereby incorporated by reference in its entirety.

Although a preferred method of fabrication has been described, steps thereof may be modified, eliminated or performed in varying sequence. For example, bearing 110 may be alternatively fabricated by forming substrate 112 into a desired configuration, such as, for example, a cylinder, prior to application of load bearing layer 114 thereon. In this regard, the substrate may be provided with structures 113 as described hereinabove, then fabricated into a tube using any convenient method, with the structures disposed on either the inner, outer, or both cylindrical surfaces thereof.

Thereafter, load bearing layer 114 may be applied to the tube in any convenient manner, such as, for example, by spray coating or dipping. Application of the load bearing layer may be performed either before or after flanging one or both ends thereof.

As a variation of this fabrication technique, substrate 112 may be fabricated into a tube, by any conventional method such as hot or cold forming operations, including roll forming, piercing, drawing or extrusion processes to produce either seamed or seamless tubes. Once so formed, structures 113 may be provided using a surface texturing technique such as a chemical etching process or the aforementioned laser treatment. Load bearing layer 114 may be applied thereafter, as previously discussed.

The invention is explained in greater detail by the following examples and tests.

In one example of a preferred embodiment of the present invention, a support 112 was formed as a sheet of steel quality St4 1.0338 LG according to the German Industrial Specification (Deutsche Industrie Norm) "DIN 1624". This sheet was provided with a thickness of 0.8 mm, including a bronze cladding approximately 80μ thick (bronze quality CuSn 6). Structures 113 were formed by passing support 112 through a conventional calender roll engraved with the negative of the desired honeycomb pattern shown in FIG. 2. The dimensions of the structures 113 forming the honeycomb pattern were substantially as described hereinabove and shown in FIGS. 2 and 3. Load bearing layer 114 was then formed by laminating a conventional skived PTFE compound sheet (composition 25% carbon/graphite, 75% PTFE) using an adhesive 120 of conventional 25μ thick PFA (Teflon® PFA by DuPont®). Parameters of the bearing layer 114 were predetermined to provide a thickness v (FIG. 3) above structures 113 of approximately 30μ. This composite was then inserted into a conventional press under a load of 4 MPa and a temperature of approximately 375° C. The temperature and pressure was maintained constant for approximately 3 minutes, then cooled to approximately 100° C. under the same load, followed by release from the press.

The resulting laminate was cut, trimmed and formed to desired geometries.

In another example, support 112 was a sheet of 0.8 mm thick aluminum (quality AlMg 04 Si 1.2) with both faces treated with chromic acid according to methods well known in the art, commonly referred to as chromate conversion coating, at 700–800 mg/m². Remaining fabrication steps were substantially identical to the example discussed hereinabove to produce similar bearings 110.

A series of comparative experiments have been carried out to show the improvements of the present invention (PI) relative to the prior art DU and Norglide (NG) bearings described hereinabove. The particular DU bearing tested was one commonly referred to as a type "Nr PG252825F." The NG bearing was fabricated using standard steel sheet laminated with 230μ thick skived PTFE sheet (composition 25% carbon/graphite, 75% PTFE) using conventional 25μ thick PFA under the conditions described hereinabove with regard to the present invention. The present invention bearing (PI) was fabricated as described hereinabove. A summary of tests conducted is provided in Table I.

TABLE I

| Test Number | Test Type | Present Invention (PI) compared with | Conclusions |
|---|---|---|---|
| 1 | Coefficient of friction vs. time | DU | PI gives low coefficient of friction over lower wear depth |
| 2 | Resistance to Creep | NG | PI resists creep better |
| 3 | Heat Conductivity | NG | PI conducts heat better, particularly with thinner bearing layers |
| 4 | Electrical Conductivity | NG | PI is better |
| 5 | Resistance to mechanical stress | NG | PT showed no delamination when flanged |

The tests for coefficient of friction were conducted on small (10 mm diameter) disks of each of the DU, NG and PI bearings. Predetermined amounts of the bearing surfaces thereof were alternately removed from outermost surface 122 thereof, then the coefficient of friction measured. This provided a profile of the coefficient of friction of each of the bearings at various depths or degrees of wear within the bearing life. The tests were conducted utilizing test methodology disclosed hereinabove. The results are shown in the following Table II.

TABLE II

| Material Removed from Bearing Layer | Friction Coefficients | | |
|---|---|---|---|
| (μ) | DU | NG | PI |
| 0 | 0.09 | 0.10 | 0.08 |
| 9 | 0.10 | — | — |
| 20 | 0.14 | 0.10 | 0.08 |
| 30 | 0.16 | 0.10 | 0.09 |
| 50 | 0.18 | 0.10 | 0.09 |
| 60 | 0.19 | — | 0.09 |
| 80 | — | 0.09 | 0.10 |
| 110 | — | 0.09 | 0.13 |
| 140 | — | — | 0.17 |
| 160 | — | 0.10 | 0.19 |

These results indicate the coefficient of friction of the DU bearing begins to increase relatively early in its life. Moreover, the friction coefficient is not constant, so that the assembly (for example, a rotating shaft and housing) will not encounter the same operating conditions such as smoothness and heat evolution over its life.

The value of 0.19 at a depth of 60μ is the friction coefficient between pure bronze and steel, which thus indicates that the available depth of lubricating material from the initial outermost surface 122 is approximately 60μ. This amount is considerably less than the total theoretical depth of the mixture of PTFE/bronze of 250–350μ of the DU bearing.

The present invention, however, shows a relatively long plateau of low friction values up to approximately 80μ. This result is surprising because one would expect this plateau to last only for the depth of the top, bronze free layer (depth "v" in FIG. 3) or 30μ as tested. The specific mechanism that provides this surprisingly long low friction plateau is not known. It is hypothesized, however, that this plateau extends to more than twice depth v due to the disposition of the bronze in discrete locations rather than being intermixed with polymer.

Results for NG are provided as a reference. Because NG does not utilize bronze in the bearing layer and is homogeneous, the friction coefficient does not vary during its life. However, it is expected that the PI bearing will provide a better wear rate over time than the NG bearing. In other words, it is expected that during actual use, the PI bearing will take substantially longer to wear to a given depth than the NG bearing.

The aforementioned creep resistance test was conducted as follows. Flat samples of the bearings, having predetermined thicknesses, were cut to dimensions of 30 mm×30 mm and pressed between two facing parallel circular plates. These plates had a bearing surface area of 1 cm$^2$ were fabricated from steel having a hardness of 840 HV (Vicker's hardness) and a roughness $R_r$ 1.3μ according to ISO Standard No. 4287/1. A compressive load of respectively 10 and 30 kN/cm$^2$ was applied by the plates onto the sample for one hour at both 23° C. and 100° C. The load was then released and the samples allowed to recover for 15 minutes. The thickness of the samples was then measured and the loss in thickness calculated. Samples of the present invention were compared to NG with similar PTFE bearing layer thickness. NG was fabricated using standard carbon/graphite filler as described hereinabove. An alternate embodiment of the present invention was also fabricated having 25 weight percent of an aromatic polyester filler sold by Carborundum Co., U.S.A., under the designation "Ekonol™, type T101." The results are shown in the following Table III.

TABLE III

| Sample | Bearing Sheet Thickness | Deformation under load (u) | | | |
|---|---|---|---|---|---|
| | | Load 10 N/cm$^2$ | | Load 30 N/cm$^2$ | |
| | | 23° C. | 100° C. | 23° C. | 100° C. |
| PI(normal) | 30μ + 100μ | 2 | 7 | 5 | 9 |
| PI(alternate) | 30μ + 100μ | 2 | 8 | 6 | 10 |
| NG | 130μ | 9 | 10 | 8 | 15 |

The bearings of the present invention were tested for heat conductivity using equipment available from Semmler and Reinhart Company, (Meitingen, Germany) type WLM 20/112. 20 mm diameter disks of the bearings were inserted between two measuring heads, set at 30° C. and 50° C. respectively. The value of heat conductivity was measured according to the manufacturer's instructions. The results shown below in Table IV show that the bearings of the invention (PI) are approximately three times better than NG, and are also better than DU at full thickness. This superior heat conductivity is apparently due to the structures 113 forming a solid connection to metal support 112, to effectively form a fin structure extending from support 112 towards the surface of load bearing layer 114. In this connection, conduction values are even higher once bearing layer 114 is worn down to structures 113 (depth v as shown in FIG. 3, or approximately 30μ in the embodiment tested). Utilizing a sandblasted substrate 112 did not result in significantly improved results.

TABLE IV

| Sample | Specific Heat Conductivity (W/m · K) |
|---|---|
| PI (full thickness) | 2.7 |
| PI (30μ removed from bearing layer) | 4.0 |
| NG (standard steel substrate) | 0.8 |
| NG (sandblasted substrate) | 1.0 |
| DU | 2.4 |
| DU (30μ removed from bearing layer) | 4.7 |

Samples of bearings were subjected to electrical conductivity tests substantially according to the conventional DIN 53482 standard, but for the following variations. Namely, thickness = total thickness of the bearing, load =3000 N (equal to 10 N/mm$^2$) and measurement taken after 5 hours dwell time at room temperature. The results are shown in

TABLE V

| Sample | Surface Resistivity Ω × cm$^2$ |
|---|---|
| PI | 0.3 |
| NG | 180 |
| NG (with sandblasted substrate) | 6.6 |

The bearings of the present invention are more resistant to mechanical stresses than standard NG. In this regard, bearings of the present invention were fabricated using a steel substrate 0.8 mm thick with bronze intermediate layer 116 and PTFE bearing layer 114 of the dimensions shown and described hereinabove with respect to FIG. 3. These bearings 110 were then formed into cylindrical bushes of the type generally shown in prior art FIG. 1 and flanged. Upon inspection, the bushes of the invention did not show any delamination, but the NG samples delaminated.

Thus, raised structures 113 of the present invention, formed integrally with substrate 112 and embedded into load bearing layer 114 enable a relatively thick bearing layer 114 of low friction self-lubricating material to be utilized. This provides bearings 110 with a relatively long bearing life. Moreover, the bearing's coefficient of friction remains low and nominally constant over its life, even, surprisingly, once load bearing layer 114 is worn down to, and into, structures 11 3. Bearings 110 are also advantageously resistant to creep and mechanical stresses, and are electrically and thermally conductive.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described the invention, what is claimed is:

1. A maintenance-free bearing comprising:
   a substrate having a surface;
   a plurality of structures disposed in spaced relation along, and extending substantially orthogonally from, said surface, said plurality of structures forming a three-dimensional, substantially uniform geometric pattern extending along said surface; and
   a load bearing layer superposed with said surface in engagement with said plurality of structures, wherein said structures are embedded into said load bearing layer.

2. The bearing as set forth in claim 1, wherein said substrate is substantially cylindrical.

3. The bearing as set forth in claim 2, wherein said substrate comprises a hollow tube, at least one end of which is adapted for being flanged.

4. The bearing as set forth in claim 1, wherein said substrate is fabricated from a metallic material.

5. The bearing as set forth in claim 4, wherein said substrate is fabricated from steel.

6. The bearing as set forth in claim 4, wherein said substrate is fabricated from aluminum.

7. The bearing as set forth in claim 1, wherein said load bearing layer comprises a lubricious plastic material.

8. The bearing as set forth in claim 7, wherein said load bearing layer is selected from the group consisting of fluoropolymers, polyimide and aromatic ketones, and combinations thereof.

9. The bearing as set forth in claim 8, wherein said load bearing layer further comprises at least one filler selected from the group consisting of carbon, graphite, aluminum oxide, silicon carbide, boron nitride, silicon nitride, glass, bronze, fluoropolymer, silicone, molybdenum disulfide, and combinations thereof.

10. The bearing as set forth in claim 1, wherein said plurality of structures comprises a polygonal pattern extending coextensively with said surface.

11. The bearing as set forth in claim 1, wherein said substrate is substantially planar.

12. The bearing as set forth in claim 1, wherein said plurality of structures are integrally disposed on said substrate.

13. The bearing as set forth in claim 12, wherein said plurality of structures are disposed in an intermediate layer, said intermediate layer being integrally disposed on said substrate.

14. The bearing as set forth in claim 13, wherein said intermediate layer comprises a metallic material.

15. The bearing as set forth in claim 14, wherein said intermediate layer comprises bronze.

16. The bearing as set forth in claim 13, wherein said plurality of structures are fabricated by passing said substrate, including said intermediate layer, through a calender having the negative of a desired pattern of structures disposed thereon.

17. The bearing as set forth in claim 16, wherein said load bearing layer is applied to said substrate by heat and pressure.

18. The bearing as set forth in claim 16, wherein said load bearing layer is applied to said substrate with an adhesive.

19. The bearing as set forth in claim 16, wherein said load bearing layer and said adhesive are fabricated as a monolayer comprising a polymer blend.

20. The bearing as set forth in claim 19, wherein said monolayer comprises PFA and PTFE.

21. The bearing as set forth in claim 20, wherein said monolayer is produced from PFA by melt extrusion.

22. The bearing as set forth in claim 20, wherein said monolayer is produced from PTFE by sheet skiving.

23. A maintenance-free bearing comprising:

a substrate having a surface;

a plurality of structures disposed in spaced relation along, and extending substantially orthogonally from, said surface, said plurality of structures forming a three-dimensional pattern extending along said surface;

said plurality of structures defining a plurality of recesses disposed therebetween, each one of said plurality of recesses being distinct from one another; and a load bearing layer superposed with said surface in engagement with said plurality of structures, wherein said structures are embedded into said load bearing layer.

24. A maintenance free bearing comprising:

a substrate having a surface;

a plurality of structures disposed in spaced relation along, and extending substantially orthogonally from, said surface, said plurality of structures defining a plurality of recesses disposed therebetween;

said plurality of structures each having a maximum width in a direction parallel to said surface, said maximum width being less than a maximum width in a direction parallel to said surface of each of said plurality of recesses; and a load bearing layer superposed with said surface in engagement with said plurality of structures, wherein said structures are embedded into said load bearing layer.

25. A maintenance-free bearing comprising:

a substrate having a surface;

a plurality of structures disposed in spaced relation along, and extending substantially orthogonally from, said surface, said plurality of structures disposed in a polygonal pattern extending along said surface; and a load bearing layer superposed with said surface in engagement with said plurality of structures, wherein said structures are embedded into said load bearing layer.

* * * * *